United States Patent

[11] 3,573,771

[72] Inventor Henry H. Cockrell, Jr.
Raleigh, N.C.

[21] Appl. No. 817,727
[22] Filed Apr. 21, 1969
[45] Patented Apr. 6, 1971
[73] Assignee International Business Machines Corporation
Armonk, N.Y.

[54] FLEXIBLE DISC MAGNETIC STORAGE DEVICE
6 Claims, 2 Drawing Figs.

[52] U.S. Cl. .......... 340/174.1, 179/100.2
[51] Int. Cl. .......... G11b 5/60
[50] Field of Search .......... 340/174.1 (E) (F); 179/100.2 (P)

[56] References Cited
UNITED STATES PATENTS

| | | | |
|---|---|---|---|
| 2,950,353 | 8/1960 | Fomenko | 340/174.1 |
| 3,110,889 | 12/1963 | Morley et al. | 340/174.1 |
| 3,135,949 | 6/1964 | Whyte | 340/174.1 |
| 3,225,338 | 12/1965 | Kelner | 340/174.1 |
| 3,303,485 | 2/1967 | Lee | 340/174.1 |
| 3,381,285 | 4/1968 | Wallen | 340/174.1 |

*Primary Examiner*—Stanley M. Urynowicz, Jr.
*Assistant Examiner*—Vincent P. Canney
*Attorneys*—Hanifin and Jancin and John B. Frisone

ABSTRACT: A flexible disc magnetic storage device in which the sole return path for the pumped air is provided through the side of the disc remote from the backer plate, thus permitting the disc to operate in an enclosed controlled environment.

INVENTOR
HENRY H. COCKRELL, JR

BY John B. Tirbone
ATTORNEY

FLEXIBLE DISC MAGNETIC STORAGE DEVICE

BACKGROUND OF THE INVENTION

1. Field of the Invention

The invention relates to magnetic disc recorders and more particularly to recorders using a flexible disc 2. Description of the Prior Art Flexible or pliant disc magnetic recorders have been known for some time. U.S. Pat. No. 2,950,353 to S. M. Fomenko issued Aug. 23, 1960 discloses such a recorder. This recorder was disclosed as operating in the open and did not provide a specific return path for the air pumped by the rotating disc It drew air from the ambient via a hole in the backer plate surrounding the disc drive spindle. This construction is marginally workable, provided no attempt is made to enclose the device in a restrictive enclosure. Thus, the device is relegated to the role of a laboratory curiosity.

T. A. Boissevain in U.S. Pat. No. 3,369,227 issued Feb. 13, 1968 discloses a technique for improving the performance of a flexible disc recorder by controlling the amount of air admitted to the space between the disc and the backer plate via holes in the backer plate by a complex air valve. Again this device will not provide satisfactory operation within restrictive enclosures, however, improved performance can be achieved in an open arrangement.

It became apparent that a practical commercially acceptable flexible disc recorder would have to operate within a restrictive enclosure for two very compelling reasons.

The disc is fragile and if subjected to severe environmental conditions, it will fail. The easiest technique for protecting the disc from dust, humidity, etc. is to enclose it in a practical sized container. Furthermore due to the inherent characteristics of the material used for the disc it is necessary to maintain temperature and humidity within very close tolerances. Again a restrictive enclosure was the only practical solution. The reason for maintaining the temperature and humidity was the anisotropic characteristics of thermal and hygroscopic expansion of the material which cause circular data tracks to become eliptical at opposite temperatures and humidity extremes. As long as temperature and humidity are controlled within narrow limits, the data and timing tracks remain circular, thus minimizing variations.

When devices constructed as shown in the above referenced patents were inserted in restrictive enclosures, they failed to operate properly and in some instances were subjected to destructive forces when the enclosures were opened and closed. An attempt was made to provide a return air path to the center of the rear side of the backer plate through large openings in the extremes of the backer plate. This attempt required large enclosures which were not practical and proved ineffective with reasonably sized enclosures.

SUMMARY OF THE INVENTION

The invention contemplates a magnetic data storage device comprising a flexible magnetic disc drive means for supporting and rotating said disc backing means spaced from said disc and defining a stationary surface coextensive with one surface of the disc said backing means being substantially impervious to fluid and substantially preventing fluid communication into the region defined by the said one surface of the disc and the confronting surface of the backing means through the backing means, and means providing a fluid communication path between the region defined above and the region coextensive with and partially defined by the other surface of the disc.

One object of the invention is to provide a flexible disc magnetic storage device which will operate in a restrictive enclosure.

Another object of the invention is to provide a magnetic storage device as set forth above which will operate in a controlled environment of practical size.

The foregoing and other objects, features and advantages of the invention will be apparent from the following more particular descriptions of preferred embodiments of the invention, as illustrated in the accompanying drawings.

DESCRIPTION OF THE PREFERRED EMBODIMENTS

Figure 1:
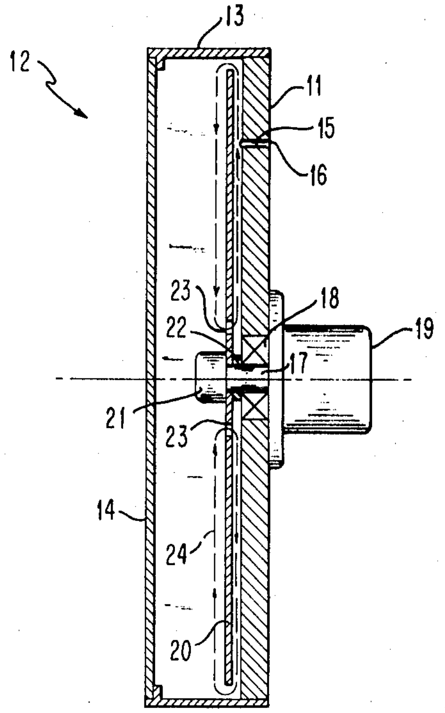
FIG. 1 is a sectional view of a flexible disc magnetic storage device constructed according to the invention.

The flexible disc magnetic recorder illustrated in FIG. 1 includes a backer plate 11 which supports a fluidtight cover 12. Cover 12 is formed by sidewalls 13 attached to backer plate 11 and a lid 14 which is hinged to one sidewall 13. Backer plate 11, sidewalls 13 and lid 14 comprise a substantially fluidtight enclosure within which the flexible disc operates.

Backer plate 11 is provided with a number of mounting holes 15 within which magnetic transducer heads 16 are mounted. The openings 15 are sealed after heads 16 are mounted to prevent fluid passage through the openings in the backer plate.

A spindle 17 is supported in a sealed bearing 18 mounted in a central opening in backer plate 11. Shaft 17 is drivingly connected to motor 19 which causes the shaft to rotate when energized.

The flexible magnetic disc 20 is provided with a central mounting hole for mounting on shaft 17, and is held in place by a clamp nut 21 which clamps the disc 20 to an annular shoulder 22 on shaft 17.

Disc 20 is provided with several holes 23 spaced radially outward from the centrally located mounted opening. Thus fluid which is pumped outwardly from the region between the backer plate 11 and the confronting surface of disc 20 is provided with a return path via openings 23. The fluid flow is indicated by the lines 24. The size, number and radial displacement of openings 23 may be varied to change the separation between backer plate 11 and the confronting surface of disc 20 for optimizing operation under different conditions.

Figure 2:
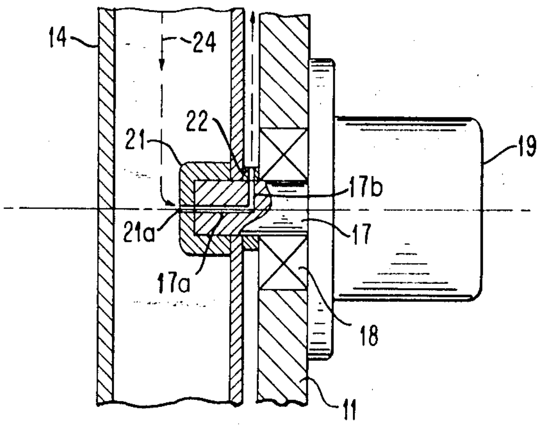
FIG. 2 is a partial sectional view of a modification of the invention illustrated in FIG. 1.

If radial fluid flow is desired or if, in a given application, it is not appropriate to admit return air to the region between the backer plate 11 and the confronting surface of the disc 20 via openings 23, the modification illustrated in FIG. 2 may be used.

In FIG. 2, a centrally located opening 21*a* is provided in clamp nut 21. This opening communicates with an axial conduit 17*a* in the shaft 17 which communicates with one or more radial conduits 17*b* which extend through the annular shoulder 22, thus providing a radially oriented return path to the region between the backer plate 11 and the confronting surface of flexible disc 20.

While the invention has been particularly shown and described with reference to preferred embodiments thereof, it will be understood by those skilled in the art that the foregoing and other changes in form and details may be made therein without departing from the spirit an scope of the invention.

I claim:

1. A magnetic data storage device suitable for operation in a restrictive enclosure comprising:

a flexible magnetic disc;

drive means for supporting and rotating said disc;

backer plate means spaced from one side of said disc and defining a fluid passage between the backer plate means and the confronting disc surface, said backer plate means being substantially impervious to fluids, transducer means mounted on said backer plate means for coacting with said flexible magnetic disc for inserting and retrieving information on said disc; and means for providing fluid communication between á first region defined by the confronting surfaces of the disc and the backer plate means and a second region defined, in part, by the other surface of the flexible disc said means being centrally located with respect to the disc periphery.

2. A magnetic storage device as set forth in claim 1 in which the means for providing fluid communications between the first and second region comprises at least one opening formed in the disc radially inward of the disc periphery.

3. A magnetic storage device as set forth in claim 1 in which the means for providing fluid communications between the first and second region comprises conduit means formed within the drive means for connecting the said first and second regions.

4. A magnetic data storage device comprising:

a flexible magnetic disc;

drive means for supporting and rotating said disc;

backer plate means spaced from one side of said disc and defining a first region between the surfaces of the backer plate means and the confronting surface of the disc said backer plate means being substantially impervious to fluids;

transducer means mounted on said backer plate means for coacting with said flexible magnetic disc for inserting and retrieving information on said disc;

cover means coacting with said backer plate means to form a restrictive enclosure surrounding said disc; and means for providing fluid communication between said first region and a second region defined in part by the other surface of the disc said means being centrally located with respect to the disc periphery.

5. A magnetic storage device as set forth in claim 4 in which the means for providing fluid communications between the first and second region comprises at least one opening formed in the disc radially inward of the disc periphery.

6. A magnetic storage device as set forth in claim 4 in which the means for providing fluid communications between the first and second region comprises conduit means formed within the drive means for connecting the said first and second regions.